(12) United States Patent
Harris et al.

(10) Patent No.: US 12,314,635 B2
(45) Date of Patent: May 27, 2025

(54) SYSTEMS AND METHODS FOR RAPIDLY DEVELOPING ANNOTATED COMPUTER MODELS OF STRUCTURES

(71) Applicant: Insurance Services Office, Inc., Jersey City, NJ (US)

(72) Inventors: Dave Harris, Orem, UT (US); Ron Richardson, South Jordan, UT (US); Corey David Reed, Cedar Hills, UT (US); Jeffery Devon Lewis, Orem, UT (US); Jeffrey Clayton Taylor, Alpine, UT (US)

(73) Assignee: Insurance Services Office, Inc., Jersey City, NJ (US)

( * ) Notice: Subject to any disclaimer, the term of this patent is extended or adjusted under 35 U.S.C. 154(b) by 828 days.

(21) Appl. No.: 17/122,080

(22) Filed: Dec. 15, 2020

(65) Prior Publication Data

US 2021/0103687 A1   Apr. 8, 2021

Related U.S. Application Data

(63) Continuation-in-part of application No. 16/189,512, filed on Nov. 13, 2018, now Pat. No. 11,688,186.
(Continued)

(51) Int. Cl.
*G06F 3/0482* (2013.01)
*G06F 3/04815* (2022.01)
(Continued)

(52) U.S. Cl.
CPC ......... *G06F 30/13* (2020.01); *G06F 3/04815* (2013.01); *G06F 3/0482* (2013.01);
(Continued)

(58) Field of Classification Search
CPC ...... G06V 20/20; G06V 20/176; G06V 20/10; G06V 20/64; G06V 20/653; G06T 11/60;
(Continued)

(56) References Cited

U.S. PATENT DOCUMENTS 5,701,403 A   12/1997   Watanabe et al.
6,446,030 B1   9/2002   Hoffman et al.
(Continued)

FOREIGN PATENT DOCUMENTS

WO   2014/151122 A1   9/2014
WO   2016/154306 A1   9/2016
WO   2017/100658 A1   6/2017

OTHER PUBLICATIONS

Sampaio et al. "Maintenance of Building Components Supported in Interactive Environments." 10th Iberian Conference on Information Systems and Technologies, Jun. 17, 2015, DOI: 10.1109/CISTI.2015.7170514, 6 pages (Year: 2015).*
(Continued)

*Primary Examiner* — Jon Chang
(74) *Attorney, Agent, or Firm* — McCarter & English, LLP

(57) ABSTRACT

Systems and methods for rapidly developing annotated computer models of structures and properties is provided. The system generates three-dimensional (3D) models of structures and property using a wide variety of digital imagery, and/or can process existing 3D models created by other systems. The system processes the 3D models to automatically identify candidate objects within the 3D models that may be suitable for annotation, such as roof faces, chimneys, windows, gutters, etc., using computer vision techniques to automatically identify such objects. Once the candidate objects have been identified, the system automatically generates user interface screens which gather relevant information related to the candidate objects, so as to rapidly
(Continued)

obtain, associate, and store annotation information related to the candidate objects. When all relevant annotation information has been gathered and associated with model objects, the system can create a list of materials that can be used for future purposes, such as repair and/or reconstruction of real-world structures and property. The system also allows for modeling of water damage of a structure, as well as generating lists of tasks for mitigating the water damage and associated costs.

12 Claims, 18 Drawing Sheets

Related U.S. Application Data

(60) Provisional application No. 62/585,078, filed on Nov. 13, 2017.

(51) Int. Cl.
  *G06F 30/12* (2020.01)
  *G06F 30/13* (2020.01)
  *G06Q 30/0283* (2023.01)
  *G06Q 40/08* (2012.01)
  *G06T 11/60* (2006.01)
  *G06V 20/20* (2022.01)
  *G06V 20/10* (2022.01)

(52) U.S. Cl.
  CPC ......... *G06F 30/12* (2020.01); *G06Q 30/0283* (2013.01); *G06Q 40/08* (2013.01); *G06V 20/20* (2022.01); *G06T 11/60* (2013.01); *G06T 2200/24* (2013.01); *G06T 2219/004* (2013.01); *G06V 20/176* (2022.01)

(58) Field of Classification Search
  CPC ........... G06T 2200/24; G06T 2219/004; G06T 2210/04; G06T 19/00; G06F 30/13; G06F 3/04815; G06F 3/0482; G06F 30/12; G06Q 30/0283; G06Q 40/08; G06Q 10/0875; G06Q 10/20; G06Q 50/08; G06Q 10/10
  See application file for complete search history.

(56) References Cited

U.S. PATENT DOCUMENTS

| | | |
|---|---|---|
| 6,448,964 B1 | 9/2002 | Saacs et al. |
| 8,533,063 B2 | 9/2013 | Erickson |
| 8,843,304 B1 | 9/2014 | Dupont et al. |
| 8,868,375 B1 | 10/2014 | Christian |
| 8,983,806 B2 | 3/2015 | Labrie et al. |
| 9,158,869 B2 | 10/2015 | Labrie et al. |
| 9,430,871 B2 | 8/2016 | Neophytou et al. |
| 9,501,700 B2 | 11/2016 | Loveland et al. |
| 9,679,227 B2 | 6/2017 | Taylor et al. |
| 10,127,670 B2 | 11/2018 | Lewis et al. |
| 10,181,079 B2 | 1/2019 | Labrie et al. |
| 10,289,760 B1 | 5/2019 | Oakes, III et al. |
| 10,387,582 B2 | 8/2019 | Lewis et al. |
| 10,445,438 B1 | 10/2019 | Motonaga et al. |
| 10,521,865 B1 | 12/2019 | Spader et al. |
| 10,529,028 B1 | 1/2020 | Davis et al. |
| 11,314,905 B2 | 4/2022 | Childs et al. |
| 11,688,135 B2 | 6/2023 | Lewis et al. |
| 11,688,186 B2 | 6/2023 | Harris et al. |
| 11,734,468 B2 | 8/2023 | Lewis et al. |
| 2002/0116254 A1 | 8/2002 | Stein et al. |
| 2003/0009315 A1 | 1/2003 | Thomas et al. |
| 2007/0080961 A1 | 4/2007 | Inzinga et al. |
| 2007/0276626 A1 | 11/2007 | Bruffey |
| 2009/0179895 A1 | 7/2009 | Zhu et al. |
| 2010/0110074 A1 | 5/2010 | Pershing |
| 2010/0114537 A1 | 5/2010 | Pershing |
| 2010/0296693 A1 | 11/2010 | Thornberry et al. |
| 2011/0056286 A1 | 3/2011 | Jansen |
| 2011/0157213 A1 | 6/2011 | Takeyama et al. |
| 2011/0191738 A1 | 8/2011 | Walker et al. |
| 2012/0026322 A1 | 2/2012 | Malka et al. |
| 2012/0179431 A1 | 7/2012 | Labrie et al. |
| 2012/0253725 A1 | 10/2012 | Malka et al. |
| 2012/0253751 A1 | 10/2012 | Malka et al. |
| 2013/0201167 A1 | 8/2013 | Oh et al. |
| 2013/0206177 A1 | 8/2013 | Burlutskiy |
| 2013/0226451 A1 | 8/2013 | O'Neill et al. |
| 2013/0262029 A1 | 10/2013 | Pershing |
| 2013/0267260 A1 | 10/2013 | Chao et al. |
| 2013/0314688 A1 | 11/2013 | Likholyot |
| 2014/0043436 A1 | 2/2014 | Bell et al. |
| 2014/0195275 A1 | 7/2014 | Pershing et al. |
| 2014/0279593 A1* | 9/2014 | Pershing ............... G06Q 10/10 705/314 |
| 2014/0301633 A1 | 10/2014 | Furukawa et al. |
| 2014/0320661 A1 | 10/2014 | Sankar et al. |
| 2015/0029182 A1 | 1/2015 | Sun et al. |
| 2015/0073864 A1 | 3/2015 | Labrie et al. |
| 2015/0093047 A1 | 4/2015 | Battcher et al. |
| 2015/0116509 A1 | 4/2015 | Birkler et al. |
| 2015/0153172 A1 | 6/2015 | Starns et al. |
| 2015/0193971 A1 | 7/2015 | Dryanovski et al. |
| 2015/0213558 A1 | 7/2015 | Nelson |
| 2015/0227645 A1 | 8/2015 | Childs et al. |
| 2015/0269438 A1 | 9/2015 | Samarasekera et al. |
| 2015/0302529 A1 | 10/2015 | Jagannathan |
| 2016/0098802 A1 | 4/2016 | Bruffey et al. |
| 2016/0110480 A1 | 4/2016 | Randolph |
| 2016/0246767 A1 | 8/2016 | Makadia et al. |
| 2016/0282107 A1 | 9/2016 | Roland et al. |
| 2017/0124713 A1 | 5/2017 | Jurgenson et al. |
| 2017/0132711 A1 | 5/2017 | Bruffey et al. |
| 2017/0132835 A1 | 5/2017 | Halliday et al. |
| 2017/0169459 A1 | 6/2017 | Bruffey et al. |
| 2017/0193297 A1 | 7/2017 | Michini et al. |
| 2017/0206648 A1 | 7/2017 | Marra et al. |
| 2017/0221152 A1 | 8/2017 | Nelson et al. |
| 2017/0316115 A1 | 11/2017 | Lewis et al. |
| 2017/0330207 A1 | 11/2017 | Labrie et al. |
| 2017/0345069 A1 | 11/2017 | Labrie et al. |
| 2018/0053329 A1 | 2/2018 | Roberts et al. |
| 2018/0067593 A1 | 3/2018 | Tiwari et al. |
| 2018/0089833 A1 | 3/2018 | Lewis et al. |
| 2018/0286098 A1 | 10/2018 | Lorenzo |
| 2018/0330528 A1 | 11/2018 | Loveland et al. |
| 2018/0357819 A1 | 12/2018 | Oprea |
| 2018/0373931 A1 | 12/2018 | Li |
| 2019/0114717 A1 | 4/2019 | Labrie et al. |
| 2019/0147247 A1 | 5/2019 | Harris et al. |
| 2019/0221040 A1 | 7/2019 | Shantharam et al. |
| 2019/0340692 A1 | 11/2019 | Labrie et al. |
| 2019/0347859 A1 | 11/2019 | Jovanovic et al. |
| 2019/0377837 A1 | 12/2019 | Lewis et al. |
| 2020/0100066 A1 | 3/2020 | Lewis et al. |
| 2020/0143481 A1 | 5/2020 | Brown et al. |
| 2021/0076162 A1 | 3/2021 | Wang et al. |
| 2021/0350038 A1 | 11/2021 | Jenson et al. |
| 2022/0309204 A1 | 9/2022 | Childs et al. |
| 2022/0309748 A1 | 9/2022 | Lewis et al. |
| 2022/0414980 A1 | 12/2022 | Lewis et al. |
| 2023/0343030 A1 | 10/2023 | Lewis et al. |
| 2023/0409769 A1 | 12/2023 | Lewis et al. |

OTHER PUBLICATIONS

Office Action dated Sep. 2, 2022, issued in connection with U.S. Appl. No. 16/580,741 (13 pages).

Notice of Allowance mailed Sep. 6, 2022, issued in connection with U.S. Appl. No. 16/189,512 (7 pages).

Office Action mailed Oct. 13, 2022, issued in connection with U.S. Appl. No. 16/545,607 (53 pages).

(56) References Cited

OTHER PUBLICATIONS

International Search Report of the International Searching Authority mailed on Nov. 18, 2022, issued in connection with International Application No. PCT/US22/030691 (6 pages).
Written Opinion of the International Searching Authority mailed on Nov. 18, 2022, issued in connection with International Application No. PCT/US22/030691 (11 pages).
Notice of Allowance mailed Dec. 9, 2022, issued in connection with U.S. Appl. No. 17/705,130 (10 pages).
Examination Report No. 1 mailed Dec. 15, 2022, issued by the Australian Patent Office in connection with Australian Patent Application No. 2021282413 (3 pages).
International Search Report of the International Searching Authority mailed on Mar. 27, 2017, issued in connection with International Application No. PCT/US2016/65947 (3 pages).
Written Opinion of the International Searching Authority mailed on Mar. 27, 2017, issued in connection with International Application No. PCT/US2016/65947 (7 pages).
Office Action mailed Sep. 26, 2018, issued in connection with U.S. Appl. No. 15/374,695 (33 pages).
Notice of Allowance mailed May 13, 2019, issued in connection with U.S. Appl. No. 15/374,695 (7 pages).
Extended European Search Report mailed Jun. 11, 2019, issued in connection with European Patent Application No. 16873975.3 (8 pages).
Communication Pursuant to Article 94(3) EPC issued by the European Patent Office mailed on Apr. 22, 2020, issued In connection with European Patent Application No. 16873975.3 (6 pages).
International Search Report of the International Searching Authority mailed on Dec. 12, 2019, issued in connection with International Application No. PCT/US2019/52670 (3 pages).
Written Opinion of the International Searching Authority mailed on Dec. 12, 2019, issued in connection with International Application No. PCT/US2019/52670 (5 pages).
Office Action mailed Feb. 5, 2020, issued in connection with U.S. Appl. No. 16/580,741 (15 pages).
International Search Report of the International Searching Authority mailed on May 14, 2015, issued in connection with International Application No. PCT/US15/015491(3 pages).
Written Opinion of the International Searching Authority mailed on May 14, 2015, issued in connection with International Application No. PCT/US15/015491 (9 pages).
Fung, et al., "A Mobile Assisted Localization Scheme for Augmented Reality," Department of Computer Science and Engineering, The Chinese University of Hong Kong, 2012 (76 pages).
Sankar, et al., "Capturing Indoor Scenes With Smartphones," UIST' 12, Oct. 7-10, 2012, Cambridge, Massachusetts (9 pages).
Office Action mailed Aug. 8, 2017, issued in connection with U.S. Appl. No. 14/620,004 (26 pages).
Office Action mailed Aug. 28, 2018, issued in connection with U.S. Appl. No. 14/620,004 (33 pages).
Farin, et al., "Floor-Plan Reconstruction from Panoramic Images," Sep. 23-28, 2007, MM '07, ACM (4 pages).
Office Action mailed Mar. 29, 2019, issued in connection with U.S. Appl. No. 14/620,004 (22 pages).
Office Action mailed Dec. 10, 2019, issued in connection with U.S. Appl. No. 14/620,004 (27 pages).
Zhang, et al., "Wallk&Sketch: Create Floor Plans with an RGB-D Camera," Sep. 5-8, 2012, UbiComp '12, ACM (10 pages).
Office Action mailed Jul. 8, 2020, issued in connection with U.S. Appl. No. 14/620,004 (27 pages).
Office Action mailed Sep. 22, 2020, issued in connection with U.S. Appl. No. 16/580,741 (14 pages).
Office Action mailed Feb. 2, 2021, issued in connection with U.S. Appl. No. 14/620,004 (28 pages).
Communication Pursuant to Article 94(3) EPC issued by the European Patent Office mailed on Feb. 18, 2021, Issued in connection with European Patent Application No. 16873975.3 (5 pages).
Examination Report No. 1 mailed Mar. 30, 2021, issued by the Australian Patent Office in connection with Australian Patent Application No. 2016366537 (6 pages).

Office Action mailed Apr. 21, 2021, issued in connection with U.S. Appl. No. 16/580,741 (15 pages).
Notice of Allowance mailed Aug. 19, 2021, issued in connection with U.S. Appl. No. 14/620,004 (11 pages).
Examiner-Initiated Interview Summary dated Aug. 10, 2021, issued in connection with U.S. Appl. No. 14/620,004 (1 page).
Communication Pursuant to Article 94(3) EPC mailed Jan. 31, 2023, issued in connection with European Patent Application No. 16873975.3 (8 pages).
Notice of Allowance mailed Feb. 14, 2023, issued in connection with U.S. Appl. No. 17/705,130 (5 pages).
Office Action dated Jan. 12, 2024, issued in connection with U.S. Appl. No. 18/214,842 (4 pages).
International Search Report of the International Searching Authority mailed on Dec. 15, 2023, issued in connection with International Application No. PCT/US2023/031123 (6 pages).
Written Opinion of the International Searching Authority mailed on Dec. 15, 2023, issued in connection with International Application No. PCT/US2023/031123 (7 pages).
Office Action mailed Dec. 27, 2021, issued in connection with U.S. Appl. No. 16/580,741 (13 pages).
Notice of Allowance mailed Dec. 16, 2021, issued in connection with U.S. Appl. No. 14/620,004 (12 pages).
Invitation to Pay Additional Fees issued by the International Searching Authority mailed on Feb. 2, 2022, issued in connection with International Application No. PCT/US21/63469 (2 pages).
Extended European Search Report dated Feb. 18, 2022, issued in connection with European Patent Application No. 19866788.3 (9 pages).
Communication Pursuant to Article 94(3) EPC issued by the European Patent Office mailed on Apr. 28, 2023, issued In connection with European Patent Application No. 19866788.3 (5 pages).
Office Action mailed Jun. 30, 2023, issued in connection with U.S. Appl. No. 17/729,613 (49 pages).
Notice of Allowance mailed Mar. 22, 2023, issued in connection with U.S. Appl. No. 16/545,607 (9 pages).
International Search Report of the International Searching Authority mailed on Apr. 8, 2022, issued in connection with International Application No. PCT/US21/63469 (5 pages).
Written Opinion of the International Searching Authority mailed on Apr. 8, 2022, issued in connection with International Application No. PCT/US21/63469 (6 pages).
Office Action mailed Mar. 25, 2022, issued in connection with U.S. Appl. No. 16/545,607 (56 pages).
Notice of Allowance mailed Apr. 8, 2022, issued in connection with U.S. Appl. No. 16/189,512 (8 pages).
Notice of Allowance mailed Jun. 21, 2022, issued in connection with U.S. Appl. No. 16/189,512 (7 pages).
Dino, et al., "Image-Based Construction of Building Energy Models Using Computer Vision," Automation in Construction (2020) (15 pages).
Fathi, et al., "Automated As-Built 3D Reconstruction of Civil Infrastructure Using Computer Vision: Achievements, Opportunities, and Challenges," Advanced Engineering Informatics (2015) (13 pages).
International Search Report of the International Searching Authority mailed on Jul. 25, 2022, issued in connection with International Application No. PCT/US22/22024 (3 pages).
Written Opinion of the International Searching Authority mailed on Jul. 25, 2022, issued in connection with International Application No. PCT/US22/22024 (5 pages).
International Search Report of the International Searching Authority mailed on Feb. 11, 2019, issued in connection with International Application No. PCT/US18/60762 (3 pages).
Written Opinion of the International Searching Authority mailed on Feb. 11, 2019, issued in connection with International Application No. PCT/US18/60762 (7 pages).
Office Action mailed Apr. 16, 2020, issued in connection with U.S. Appl. No. 16/189,512 (10 pages).
U.S. Appl. No. 62/512,989, filed May 31, 2017 entiitled, "Systems and Methods for Rapidly Developing Annotated Computer Models of Structures" (47 pages).

(56) References Cited

OTHER PUBLICATIONS

Office Action mailed Dec. 14, 2020, issued in connection with U.S. Appl. No. 16/189,512 (10 pages).
Extended European Search Report dated Jul. 1, 2021, issued by the European Patent Office in connection with European Application No. 18876121.7 (8 pages).
Office Action mailed Jul. 20, 2021, issued in connection with U.S. Appl. No. 16/189,512 (11 pages).
Examination Report No. 1 mailed Apr. 12, 2023, issued by the Australian Patent Office in connection with Australian Patent Application No. 2018364813 (3 pages).
Office Action mailed Dec. 7, 2023, issued by the Canadian Patent Office in connection with Canadian Patent Application No. 3,082,516 (6 pages).
Office Action dated Jan. 30, 2024, issued in connection with U.S. Appl. No. 17/895,500 (16 pages).
Office Action dated Mar. 14, 2024, issued in connection with U.S. Appl. No. 18/236,728 (58 pages).
Notice of Allowance dated Mar. 18, 2024, issued in connection with U.S. Appl. No. 17/729,613 (10 pages).
Communication Pursuant to Article 94(3) EPC mailed Jan. 23, 2024, issued by the European Patent Office in connection with European Patent Application No. 19866788.3 (5 pages).
Office Action dated Jun. 4, 2024, issued by the Canadian Intellectual Property Office in connection with Canadian Application No. 3,082,516 (4 pages).
Notice of Allowance dated Jul. 3, 2024, issued in connection with U.S. Appl. No. 17/895,500 (6 pages).
Notice of Allowance dated Jul. 12, 2024, issued in connection with U.S. Appl. No. 17/729,613 (9 pages).
Extended European Search Report dated Oct. 14, 2024, issued by the European Patent Office in connection with European Application No. 21907688.2 (11 pages).
Communication Pursuant to Article 94(3) EPC issued by the European Patent Office mailed on Dec. 19, 2024, issued in connection with European Patent Application No. 18876121.7 (4 pages).
Office Action dated Jan. 15, 2025, issued in connection with U.S. Appl. No. 17/329,098 (11 pages).
Examiner's Report dated Feb. 15, 2025, issued by the Canadian Intellectual Property Office in connection with Canadian Application No. 3,082,516 (6 pages).
Annotely—Image Annotation Made Simple. Annotate Any Image Anywhere, <https://annotely.com/releases> (2010) (18 pages).
Partial Supplementary European Search Report dated Mar. 26, 2025, issued by the European Patent Office in connection with European Application No. 22811964.0 (13 pages).

* cited by examiner

| Actions | Estimate Defaults | User Defaults | Items |

Roof Face

| | |
|---|---|
| Action: | Replace Existing ▼ |
| New Material Type: | Composition ▼ |
| Composition Type: | Laminated Shake Look ▼ |
| Quality: | Unknown ▼ |
| Removal: | Same as New Roof ▼ |

Drip Edge

| | |
|---|---|
| Eave: | None/Leave Existing ▼ |

Underlayment

| | |
|---|---|
| Ice/Water Shield Action: | Replace (None - See Defaults) ▼ |
| Felt: | Unknown ▼ |

Flashing

| | |
|---|---|
| Side Wall Action: | None ▼ |

Starter Course

| | |
|---|---|
| Eave: | Laminated Double Layer ▼ |

Ridge Cap

| | |
|---|---|
| Action: | Replace ▼ |
| Type: | Standard Profile Comp. ▼ |

Ridge Vent

| | |
|---|---|
| Action: | Detach and Reshingle ▼ |
| Shingle Type: | Standard Profile Comp. ▼ |
| Full Reshingle: | Yes ▼ |

Reflective Tube

| | |
|---|---|
| Action: | Replace Flashing Only ▼ |

Actions  Estimate  Defaults  User Defaults  [Items]

[All Items ▸]

| Act | Description | Qty | Unit Price | Total |
|---|---|---|---|---|
| - | Lam. Shake Look | 3.63/SQ | $37.95 | $137.76 |
| - | Steep Charge (7/12 - 9/12) | 3.63/SQ | $7.76 | $28.17 |
| + | Felt (15#) | 3.63/SQ | $21.17 | $76.85 |
| + | Starter (Lam. Dbl Layer) | 7.2/LF | $3.71 | $26.71 |
| + | Reflective Tube Flashing | 4/EA | $24.85 | $99.40 |
| + | Lam. Shake Look | 4.25/SQ | $262.85 | $1,117.11 |
| + | Steep Charge (7/12 - 9/12) | 4.08/SQ | $25.41 | $103.67 |
| + | Ridge Cap (Comp High Prof) | 29.47/LF | $4.56 | $134.38 |
| + | Ridge Vent - Detach & Reset | 5.97/LF | $4.49 | $26.81 |
| & | Ridge Cap (Comp High Prof) | 5.97/LF | $6.12 | $36.54 |

Zone Air Moving Equipment

Suggested per LF of affected wall: 12

Suggested per SF of affected area: 19

Total air movers placed: 5

(DRY+) Axial Fan: 5   Total (0-99)

Days: 17

Add for HEPA Filter: No

| Actions | Estimate Settings | Items | | Mitigation | |
|---|---|---|---|---|---|
| All Items | | | | | |
| Act | Description | Qty | UnitPrice | Total |
|---|---|---|---|---|
| - | Tear out wet non-salvageable carpet, cut/bag - Cat 3 water | 268.44/SF | $0.89 | $238.91 |
| - | Tear out tackless strip and bag for disposal - Category 3 | 80.74/LF | $1.27 | $102.54 |
| - | Tear out non-salv wood floor & bag - Category 3 water | 308.05/SF | $5.54 | $1,706.60 |
| - | Tear out non-salvageable tile floor & bag - Cat 3 water | 42.50/SF | $4.24 | $180.20 |
| - | Tear out non-salv underlayment & bag - Category 3 water | 308.05/SF | $1.84 | $566.81 |
| + | Clean with pressure/chemical spray | 214.90/SF | $0.30 | $64.47 |
| + | Clean with pressure/chemical spray - Light | 327.65/SF | $0.23 | $75.36 |
| + | Water extraction from hard surface floor | 542.55/SF | $0.22 | $119.36 |
| + | Dry ice blast exposed framing - Floor (PER SF) | 65.40/SF | $6.25 | $408.75 |
| + | HEPA Vacuuming exposed framing - Floor - (PERSF) | 65.40/SF | $1.19 | $77.83 |
| + | Add for HEPA filter (for upright vacuums) | 2.00/EA | $32.91 | $65.82 |
| - | Tear out wet drywall, cleanup, bag, per LF - to 4' - Cat 3 | 96.47/LF | $3.81 | $367.55 |
| + | Clean {V} - Light | 0.00/SF | $0.37 | $0.00 |
| - | Tear out wet drywall, cleanup, bag - Cat 3 | 264.63/SF | $1.43 | $378.42 |
| + | Air mover axial fan (per 24 hour period) - No monitoring | 17.00/EA | $27.93 | $474.81 |
| + | Water extraction from carpeted floor - Category 3 water | 268.44/SF | $1.15 | $308.71 |
| + | Water extraction from hard surface floor - Cat 3 water | 327.65/SF | $0.70 | $229.36 |
| + | Equipment setup, take down, and monitoring (hourly charge) | 227.00/HR | $47.18 | $10,709.86 |
| - | Tear out baseboard and bag for disposal | 170.12/LF | $0.98 | $166.72 |

FIG. 18

SYSTEMS AND METHODS FOR RAPIDLY DEVELOPING ANNOTATED COMPUTER MODELS OF STRUCTURES

CROSS-REFERENCE TO RELATED APPLICATIONS

This application is a continuation-in-part of U.S. patent application Ser. No. 16/189,512 filed Nov. 13, 2018, which claims the benefit of U.S. Provisional Patent Application No. 62/585,078, filed on Nov. 13, 2017, the entire disclosures of which are both expressly incorporated herein by reference.

BACKGROUND

Field of the Disclosure

The present disclosure relates to computer modeling of structures and property. More specifically, the present disclosure relates to systems and methods for rapidly developing annotated computer models of structures.

Related Art

It is well-known in the field of computer-aided design (CAD) to utilize software products to create computer models of structures. Indeed, for many years, computers have been used to develop models of structures and property for various purposes. For example, various, customized software packages have been developed for many years which allow insurance companies, contractors, and other entities, to create models of structures and properties. One such example is the XACTIMATE software package, which is widely used in the insurance claims processing industry to create computerize models of buildings and materials for purposes of repairing and replacing structures due to property damage and other causes.

In addition to the above, there have been rapid advances in the fields of computer-generated models of structures and property by applying computer vision techniques to digital imagery (e.g., aerial imagery, satellite imagery, etc.) to create three-dimensional (3D) models of such structures. Examples of widely-used software packages which generate such models from aerial imagery include the GEOMNI ROOF and GEOMNI PROPERTY software packages. These systems create complex, three-dimensional models of structures by processing features in aerial images.

While the advent of computer vision techniques have made the process of creating models of structures (and property) easier to accomplish than was previously possible, there is still a need to rapidly create annotated computer models of structures, e.g., models of buildings, property, and other structures which not only accurately model the real-world structures that they represent, but also are annotated with rich information delineating real-world attributes relating to such structure. Accordingly, the systems and methods of the present disclosure address these shortcomings of existing technologies.

SUMMARY

The present disclosure relates to systems and methods for rapidly developing annotated computer models of structures and property. The system can generate three-dimensional (3D) models of structures and property using a wide variety of digital imagery, and/or can process existing 3D models created by other systems. The system processes the 3D models to automatically identify candidate objects within the 3D models that may be suitable for annotation, such as roof faces, chimneys, windows, gutters, etc., using computer vision techniques to automatically identify such objects. Additionally, for each identified object, the system also automatically searches for and identifies additional related objects that may be suitable candidates for annotation. Once the candidate objects have been identified, the system automatically generates user interface screens which gather relevant information related to the candidate objects, so as to rapidly obtain, associate, and store annotation information related to the candidate objects. Additionally, the system dynamically adjusts questions presented to users in the user interface screens so as to increase the speed with which relevant information is obtained from users and associated with the objects of the model. When all relevant annotation information has been gathered and associated with model objects, the system can create a list of materials that can be used for future purposes, such as repair and/or reconstruction of real-world structures and property. The system additionally allows for rapid development of annotated models relating to water damage and/or mitigation of a structure.

BRIEF DESCRIPTION OF THE DRAWINGS

The foregoing features of the disclosure will be apparent from the following Detailed Description, taken in connection with the accompanying drawings, in which:

FIGS. 5-6 are screenshots illustrating sample user interface screens generated by the system for allowing annotation of selected objects of the model;

FIG. 7 is a screenshot illustrating a unified user interface generated by the system of the present disclosure, wherein the user can select candidate objects of the model and create associated annotations in a single user interface;

FIG. 8 is a screenshot illustrating a materials and price list automatically generated by the system based on the annotated model generated by the system;

FIG. 15 is diagram illustrating a user interface tool for guided capturing of information relevant to modeling of water damage and/or mitigation of a structure;

FIGS. 16-17 are diagrams illustrating user interface tools for performing calculations for equipment relating to water damage and/or mitigation of a structure; and FIG. 18 is a diagram illustrating a report generated by the system listing tasks and associated costs for mitigating water damage of a structure as modeled by the system.

DETAILED DESCRIPTION

The present disclosure relates to systems and methods for rapid development of annotated computer models of structures and property, as described in detail below in connection with FIGS. 1-18.

Figure 1:
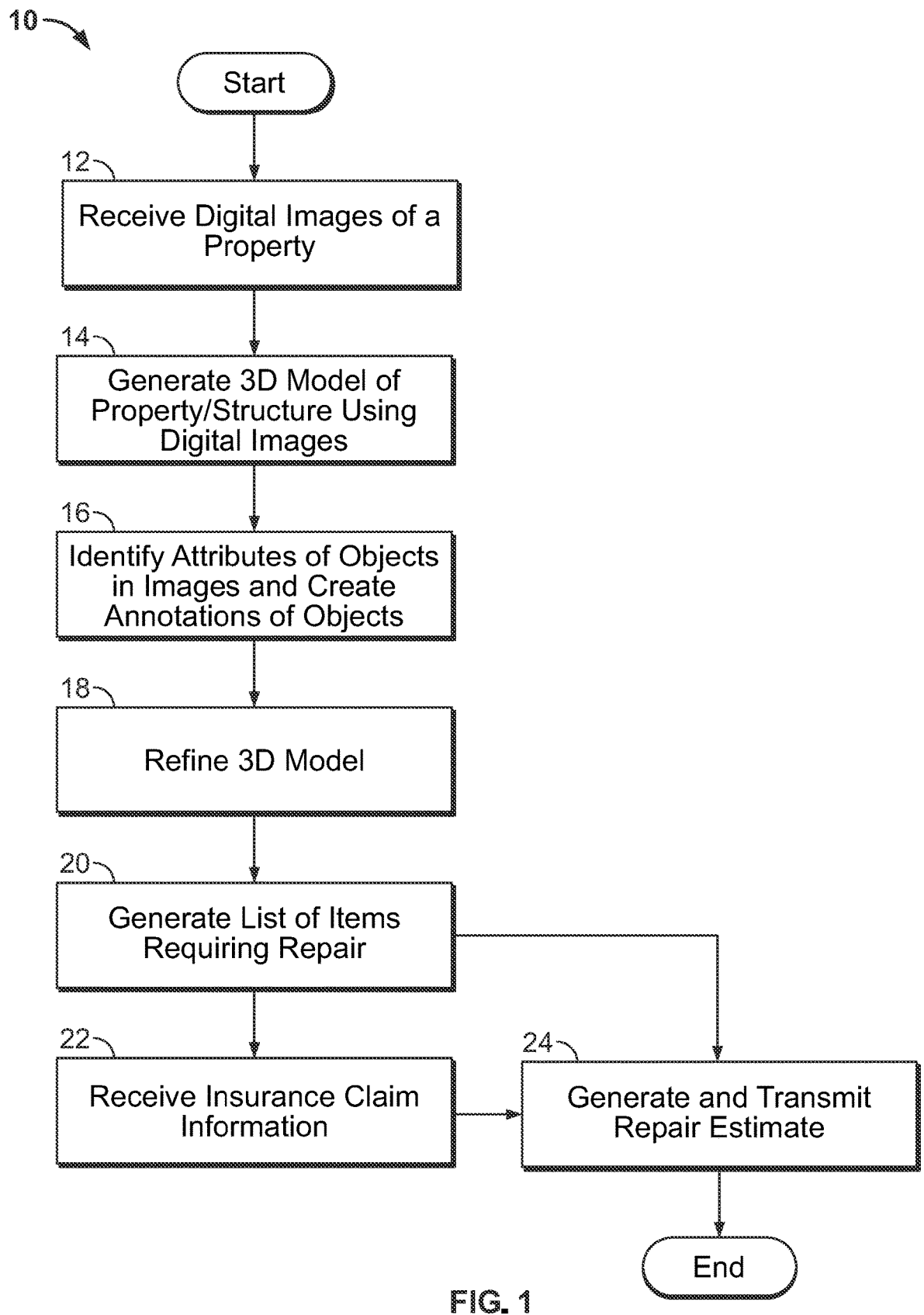
FIG. 1 is a flowchart illustrating high-level processing steps carried out by the system of the present disclosure.
Figure 2:
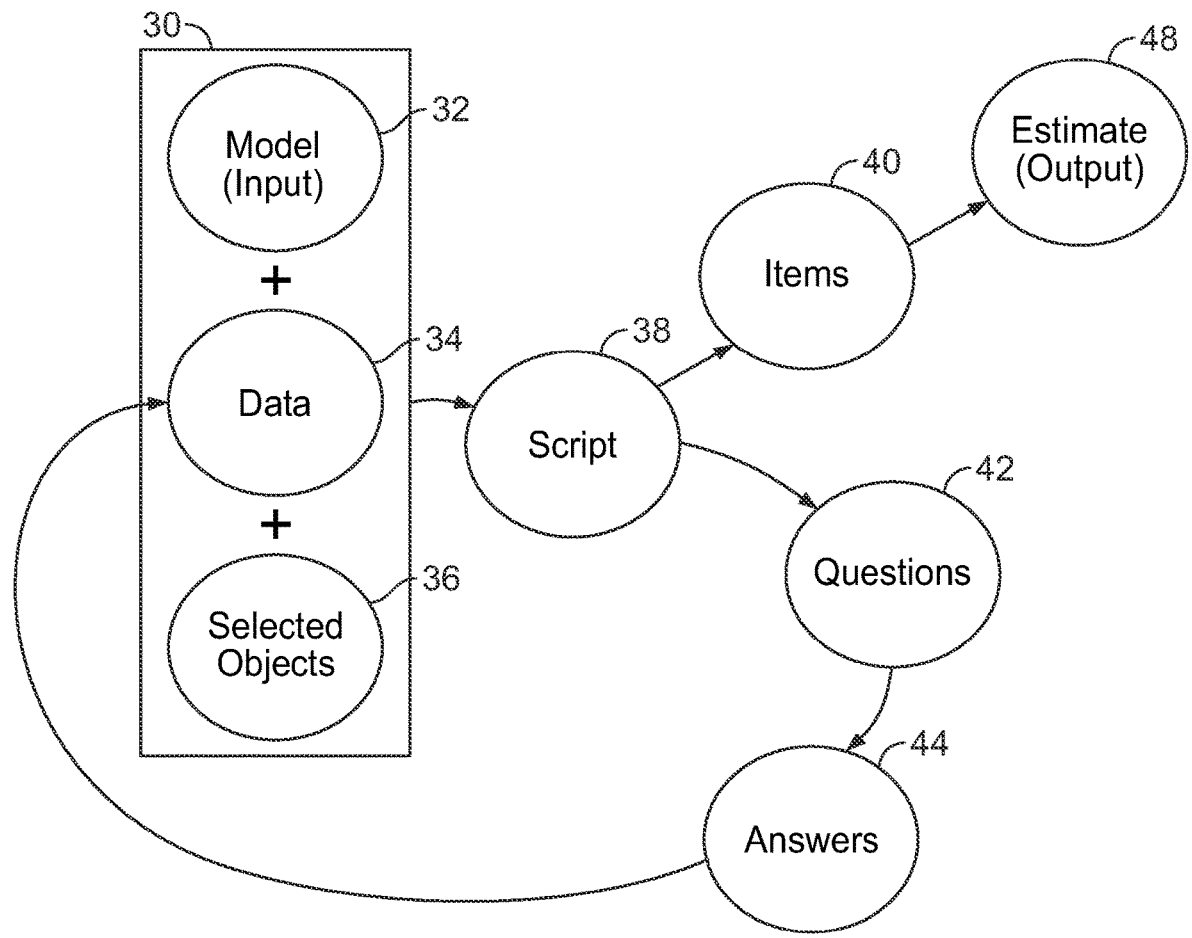
FIG. 2 is a diagram illustrating processing step 18 of FIG. 1 in greater detail.

FIG. 1 is a diagram illustrating overall process steps carried out by the system, indicated generally at 10. As noted above, the system of the present disclosure provides a single, unified, computer-based tool and associated user interface which allows a user to rapidly and accurately generate detailed, annotated, object-based models of properties and structures. Beginning in step 12, the system could receive one or more digital images of a property. Such images could be stored locally, retrieved from a database (local or remote), and/or retrieved from a third-party digital imagery provider's computer system(s). Images of a property could be gathered from many possible sources including, but not limited to, satellites, aircraft, drones, and from ground-based cameras. As each image is captured, a set of metadata could be generated by the system, which describes the image. The metadata can include, but is not limited to: GPS coordinates, altitude, direction of the camera, angle of the camera, camera intrinsic parameters, date and time of capture, etc. The actual image and the metadata for that image are stored together by the system as an image "set." A group of image sets could then be combined into a package associated with a particular location. Such a package can be stored (e.g., on a server) and retrieved on demand. While the system of the present disclosure is not limited by any particular techniques for acquiring digital images and associated metadata (and, indeed, the system could utilize images that have already been acquired and processed to include metadata, e.g., from a third party imagery provider), one example of a technique for acquiring images of structures and properties is disclosed in U.S. Provisional Application Ser. No. 62/512,989, the entire disclosure of which is expressly incorporated by reference herein in its entirety.

In step 14, the images and metadata (package) can be processed by the system using one or more computer vision algorithms to create a three-dimensional (3D) model of the property/structure, as well as damage to such property/structure. It is noted that the system need not create a 3D model from aerial images, and indeed, the system could receive and process a previously-created 3D model that is transmitted to the system from another computer, if desired. If it is desired to create a 3D model from multiple images of the same property, there are numerous ways that such a 3D model can be generated. Known software tools can be used which perform sophisticated image processing algorithms to automatically extract the information from the images and generate the model. Other software tools allow operators to manually generate the models with some computer assistance. Still other tools use a combination of automatically generated and manually generated models. In any case, the result is a raw geometric model consisting of polygons, line segments and points. If the system is utilized to generate a 3D model from the aerial imagery, various techniques could be used by the system to carry out such modeling, including but not limited to, one or more of the techniques disclosed in issued U.S. Pat. Nos. 9,679,227 and 9,501,700; published PCT Application No. PCT/US2016/065947; and U.S. patent application Ser. No. 15/277,359, the entire disclosures of which are expressly incorporated herein by reference, or any other suitable techniques.

In step 16, the system identifies attributes of objects in the property, and annotates the 3D model of the property/structure. In particular, in this step, the system automatically identifies components of the 3D model, such as points, lines, panels, geometric shapes, and free shapes, as candidates for annotation. For example, the system could automatically include points of the model as candidate structures for annotation as roof vents, lines of the model as candidate structures for annotation as gutters, panels (planar sections) of the model as candidate structures for annotation as skylights or windows, and various geometric shapes as candidates for annotation as other structures such as trees, vegetation, etc. Such automatic selection of objects of the 3D model as candidates for annotation could be accomplished using known computer vision techniques such as edge detection and classification techniques, region growing techniques, machine learning, etc. Such attributes and associated annotation(s) can include, but are not limited to:

Point elements for annotation: roof vents, finials, HVAC, bin containers, etc.

Line elements to annotate: rain gutters, cornices, ridge vents, railings, etc.

Panel elements to annotate: solar skylights, panels, entrances, garage doors, windows, etc.

Geometric shapes to annotate: roads, pools, sport courts, trampolines, etc.

Free shapes to annotate: trees, vegetation, etc.

Any elements can have specific features associated therewith. For example, exterior walls could be made from brick, stone, stucco, metal or some other material. Roofs could be made from asphalt shingles, ceramic tile, shake, metal, etc. Roof vents could be turbine, turtle or some other type of vent. When the features are associated with a candidate object for annotation, they are stored as part of the annotation. The annotation information can be generated manually, through an automated process, or through some combination of the two. The automated process utilizes computer vision and machine learning techniques. The automated annotations can be broken into two types: structural and non-structural annotations. Structural annotations are elements that are attached to the 3D model of a structure. Examples of structural annotations are: roof vents, skylights, solar panels and roof materials. Non-structural annotations are those not related to any 3D model. Examples of non-structural annotations are: pools, trees, trampolines, and concrete flatwork.

When annotations are entered manually, the system assists the operator in identifying, locating and entering elements associated with real-world items into the model. The system projects properly-oriented models onto different images of the property from different sources and orientations, to assist the user with annotation. The operator can then interact with the tool by adding a new property feature to the model, removing an existing property feature, or adding additional information about an existing property feature. These manual annotations can be entered at the time of the model creation or anytime afterward.

In step 18, the system refines the 3D model after attributes of objects in the model have been identified and annotated, as noted above. An interactive process is implemented in step 18, and is illustrated in greater detail in connection with FIG. 2. In step 30, the model 32, associated model data 34, and selected objects 36 are processed by a script 38 which automatically generates a list of items 40 and questions 42 to be answered by the user of the system. The model 32 is the 3D representation of a property and the real world objects associated with it as described previously. The data 34 represents the "pre-filled" annotation information supplied through an automated process, manually by an operator and/or the information gleaned from the answers to the questions for each of the property objects. The selected objects 36 provide the operator with the ability to select one or more property objects. This allows the operator to focus his attention on one thing or aspect of the property at a time. The script 38 directs the information coming from the combination of the model, the data and the selected objects to form a set of questions which is presented to the operator. The questions 42 prompt the operator for input details related to the selected objects. Only questions relevant to the selected objects and to previously answered questions are shown to the operator, in response to which the operator provides answers 44. The answers 44 are then saved with the model 30. Changes in data 34 may cause the script to perform a different set of steps, therefore at each question change, the process is cycled and a potentially new set of questions is generated. The items 40 represent a listing of the real world purchasable items and quantities for all property objects. This list is then passed to the estimate 48 as the final output for this given process. External to the process, the list of generated items is then associated with a price for the area where the property exists. Given the item prices, the quantity, the taxes, and other information relevant to the claim (such as deductible), an estimate of the cost to replace and the indemnity to the policy holder can be created.

Turning back to FIG. 1, once the model has been refined in step 18, in step 20 the system generates the list of items 40 as noted above. Then, in step 22, the system could optionally process insurance claim information, if desired. Finally, in step 24, the system processes both the list of items requiring repair and any insurance claim information to generate and transmit a repair estimate.

Figure 3:
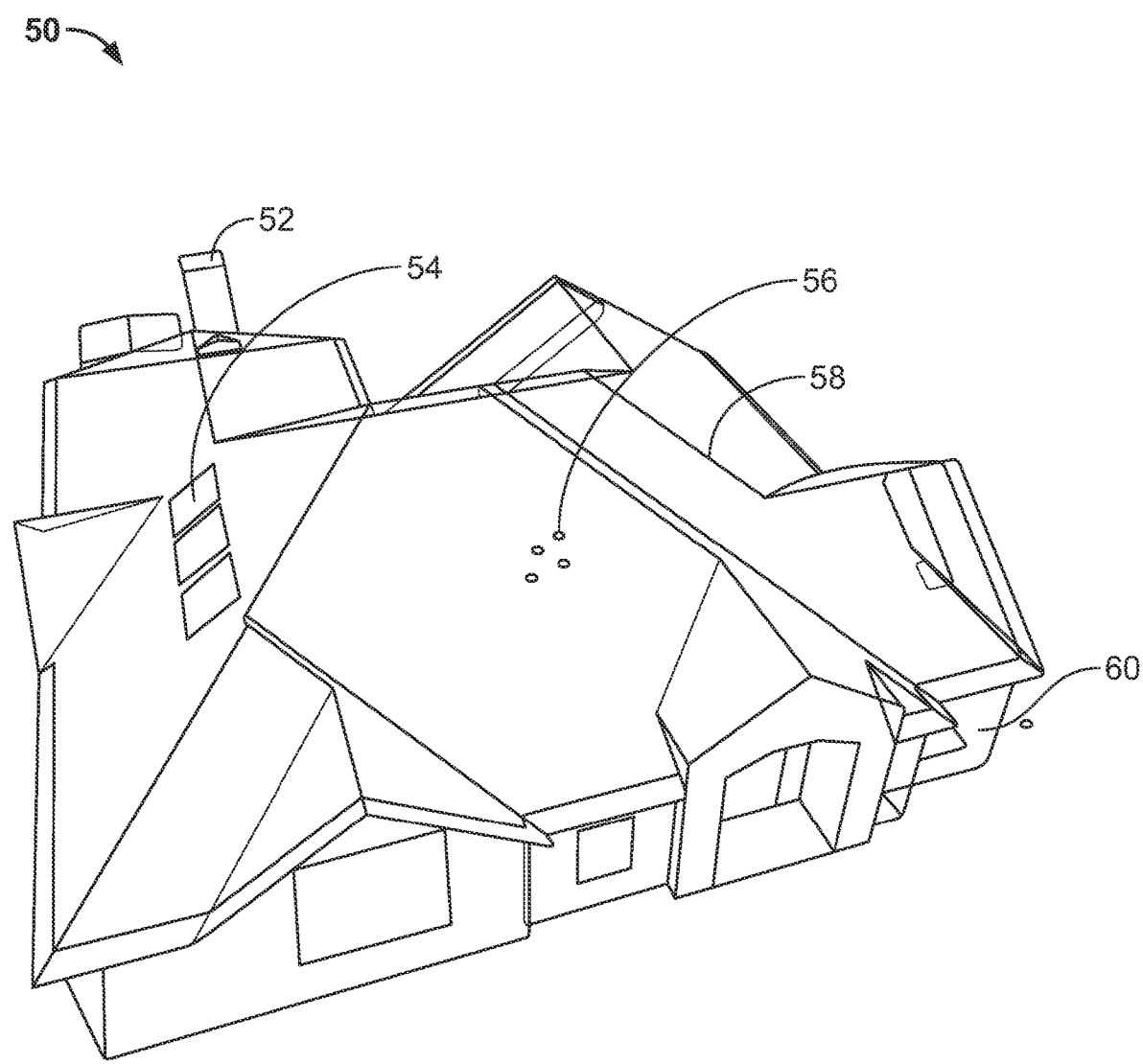
FIGS. 3-4 are diagrams illustrating visualizations of the computer models generated by the system of the present disclosure, including candidate objects automatically identified by the system for annotation.

FIG. 3 is a diagram showing a visualization of the model, indicated generally at 50. Various colors could be included in the model to represent the types of property objects. Red lines, for example, could represent roof valleys, blue lines (58) could represent roof ridges, green lines could represent eaves and rakes, etc. Any desired type of indicia could be used to indicate different roof elements. The rectangles 54 of the model represent skylights. The rectangle 52 could represent a chimney top, and the green dots 56 could represent roof vents. Walls 60 could also be represented in the model 50. Connected together, the operator can match the real world objects with the model as it is stored internally in memory in a computer system.

Figure 4:
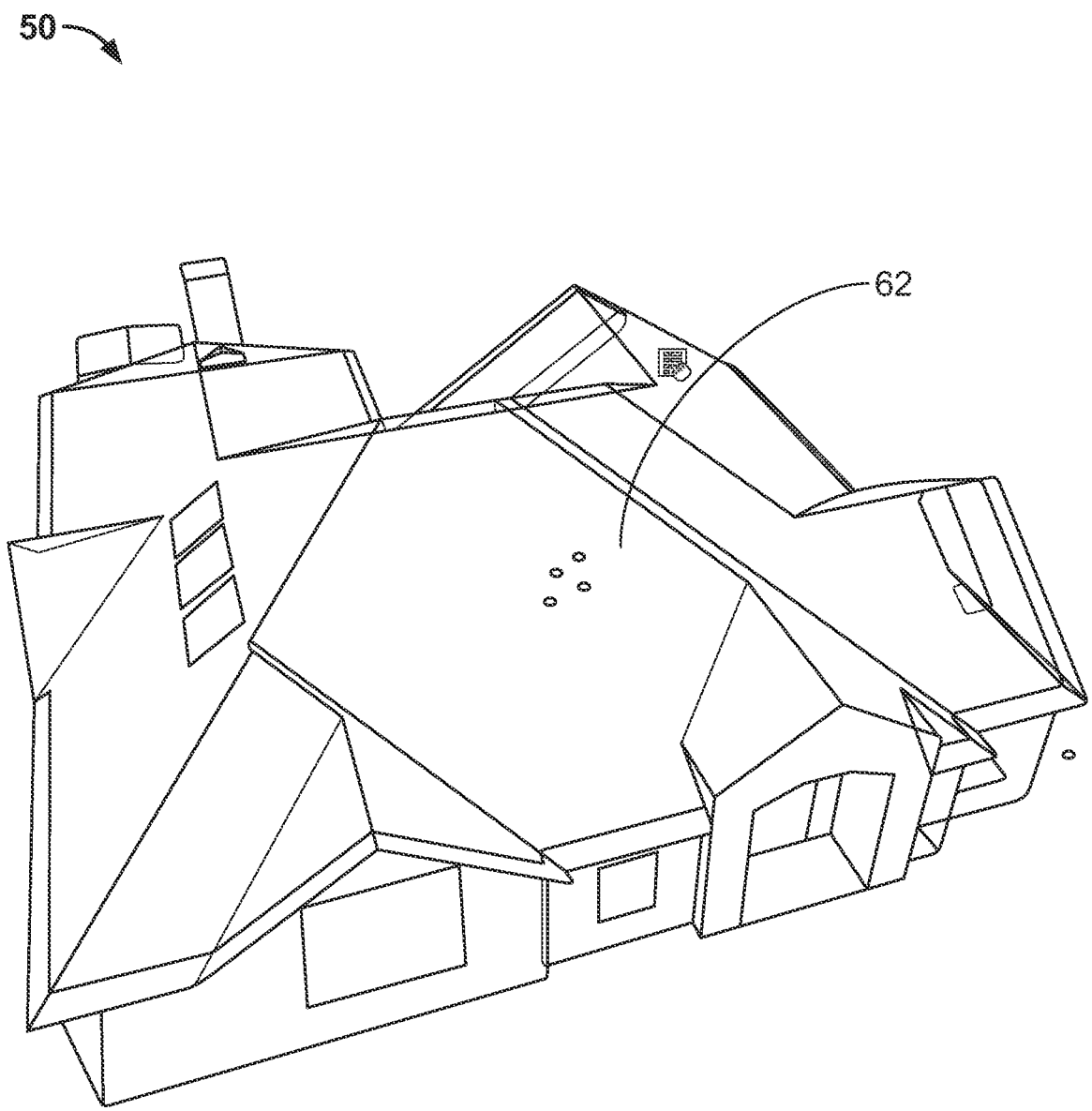

As shown in FIG. 4, the user interface of the system provides the user with the ability to select an object of the model by clicking on it, and to define attributes of that object and to annotate the object. As shown, the user can select a roof face 62 of the model 50 by clicking on the face 62. The face 62 is highlighted to provide feedback to differentiate the selected object. To assist the operator, all touching lines and enclosed single roof objects (in this case vents) can automatically be included by the system, and automatically identified as objects that are candidates for annotation as described below. Indeed, for example, when the user clicks on the roof face 62, the system searches for all objects in the model, such as ridge vents, gutters, underlayments, etc., that contact or form part of the roof face 62, and automatically labels those objects as candidates for further annotation. Thus, since the system automatically (through computer vision techniques) delineates candidate objects in the model for annotation, the system rapidly increases the efficiency and speed with which annotated computer models of structures are developed.

Figure 5:
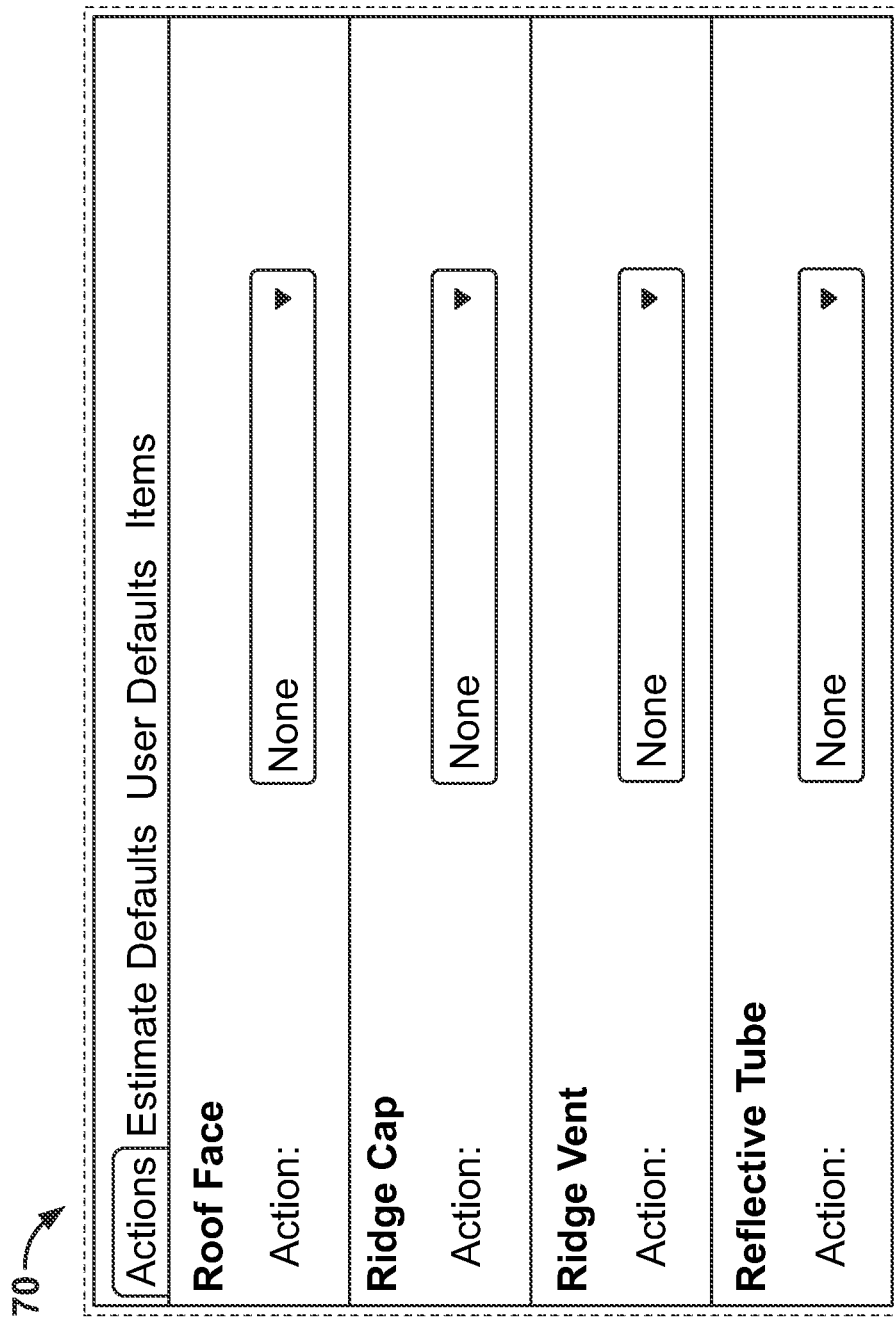

The annotation process enabled by the system of the present disclosure will now be described in greater detail. When the user clicks on the object (roof face) 62, the user interface of the system automatically generates a user interface screen 70 as shown in FIG. 5. Given the model, the data, and the selected information, a software script of the system can automatically generate a set of appropriate questions as shown in the screen 70 of FIG. 5. The user must first determine what repairs need to be done with the roof face 62. If no information has been "pre-filled" in this regard, the script presumes that nothing will be done unless the operator specifically selects an action. However, as shown in the user interface screen 70 of FIG. 6, if the user desires to take an action, the user can do so using the various drop-down boxes which are automatically generated by the system. For this example, the operator can pick the drop down action of "Replace Existing" as shown in FIG. 6. This causes the screen 70 to automatically generate further questions to be answered by the user using drop-down boxes, such as specifying the new type of roof material to be used, composition type of the roof material, quality of the roof material, information relating to removal of the material, etc. By processing the user's answer to generate further questions, the system recycles the process and causes the automatic regeneration of a set of questions as illustrated in FIG. 6. Having determined that the roof is going to be replaced, the user interface 70 automatically generates questions which show the user that it is also possible to replace the drip edge, the flashing, the starter course and other material associated with replacing the face, as prompted by the additional questions and drop-down boxes shown in FIG. 6.

Note that the "New Material Type" question shown in the user interface 70 in FIG. 6 contains the value of "Composition" and the "Composition Type" question contains the value of "Laminated Shake Look". This is part of the "pre-filled" data that was obtained at the time the property model was created. The operator does not need to pick an answer to these questions unless the "pre-fill" data were incorrectly determined. The quality question under the "Composition Type" has a current answer of "Unknown" for purposes of illustration only. That piece of information could be supplied by the operator by inspecting the property in person, looking at receipts, or by other means, if desired.

Figure 7:
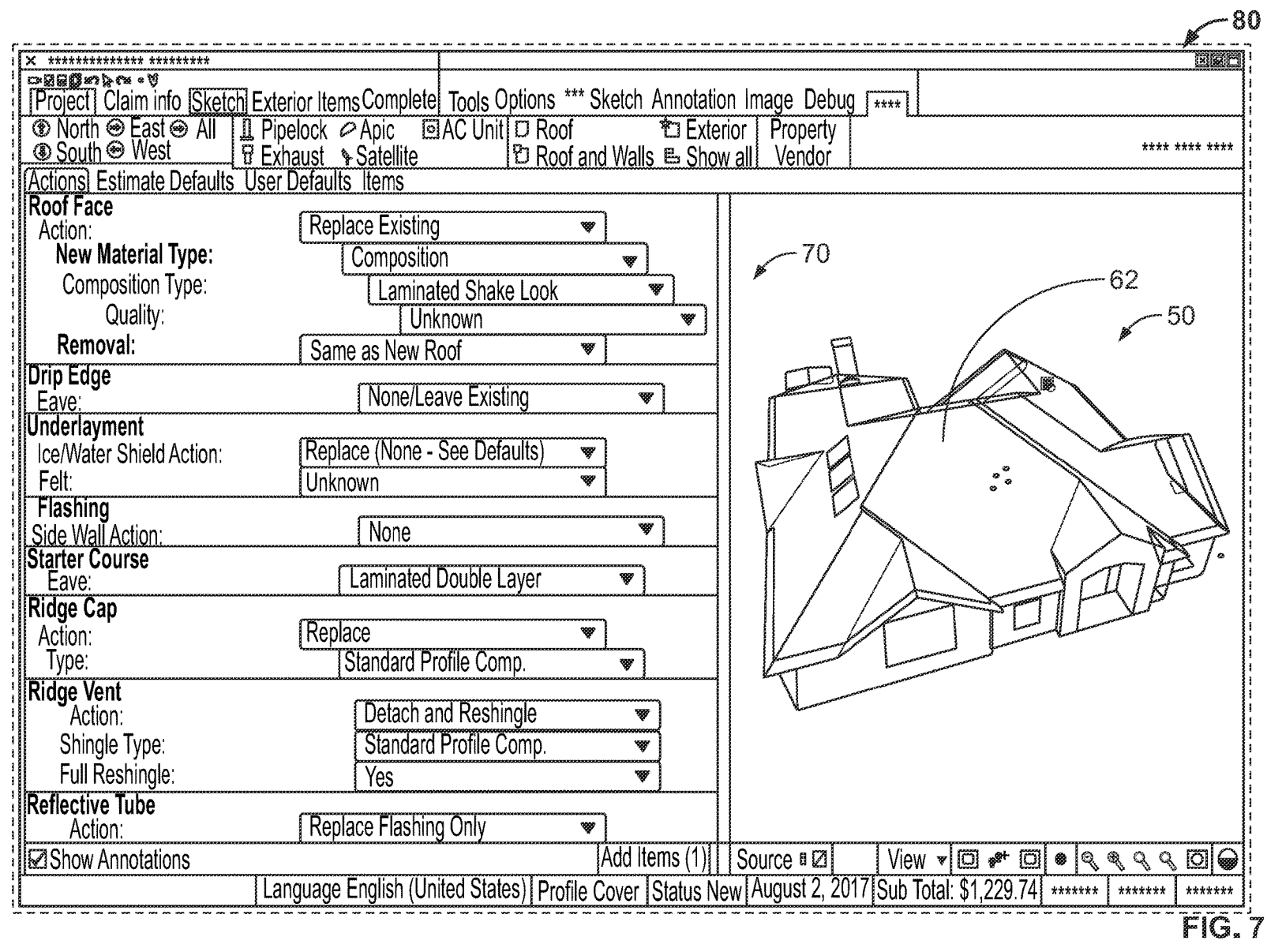

FIG. 7 illustrates a unified user interface 80 generated by the system, which allows the user to interact in a single user interface with the 3D model 50 of the structure as well as the user interface screen 70 for annotating the model and specifying information about objects of the model, as discussed above, using targeted responses to questions automatically generated by the system. Each answer to a question provided by the user (e.g., by changing selections of the pull-down prompts in response to associated questions) cycles the process back to regenerating the questions dynamically, thus providing a rich user interface which elicits the most relevant information from the user related to objects in the model. The process continues iteratively until the operator has picked an answer for each question for each object (such that multiple objects can be selected at once).

In so doing, the system allows for the rapid generation of annotated computer models of structures and property.

As part of the iterative process, a set of real-world items is generated each time an answer to a question is changed. This is illustrated in the version of the user interface 70 shown in FIG. 8. As can be seen, the user interface 70 displays items that can be purchased for the purpose of repairing the property. The unit pricing could be provided by an estimation software package. Furthermore, the resultant items list can be linked to an insurance claims software and an estimation software package to generate the insurance estimate.

Figure 9:
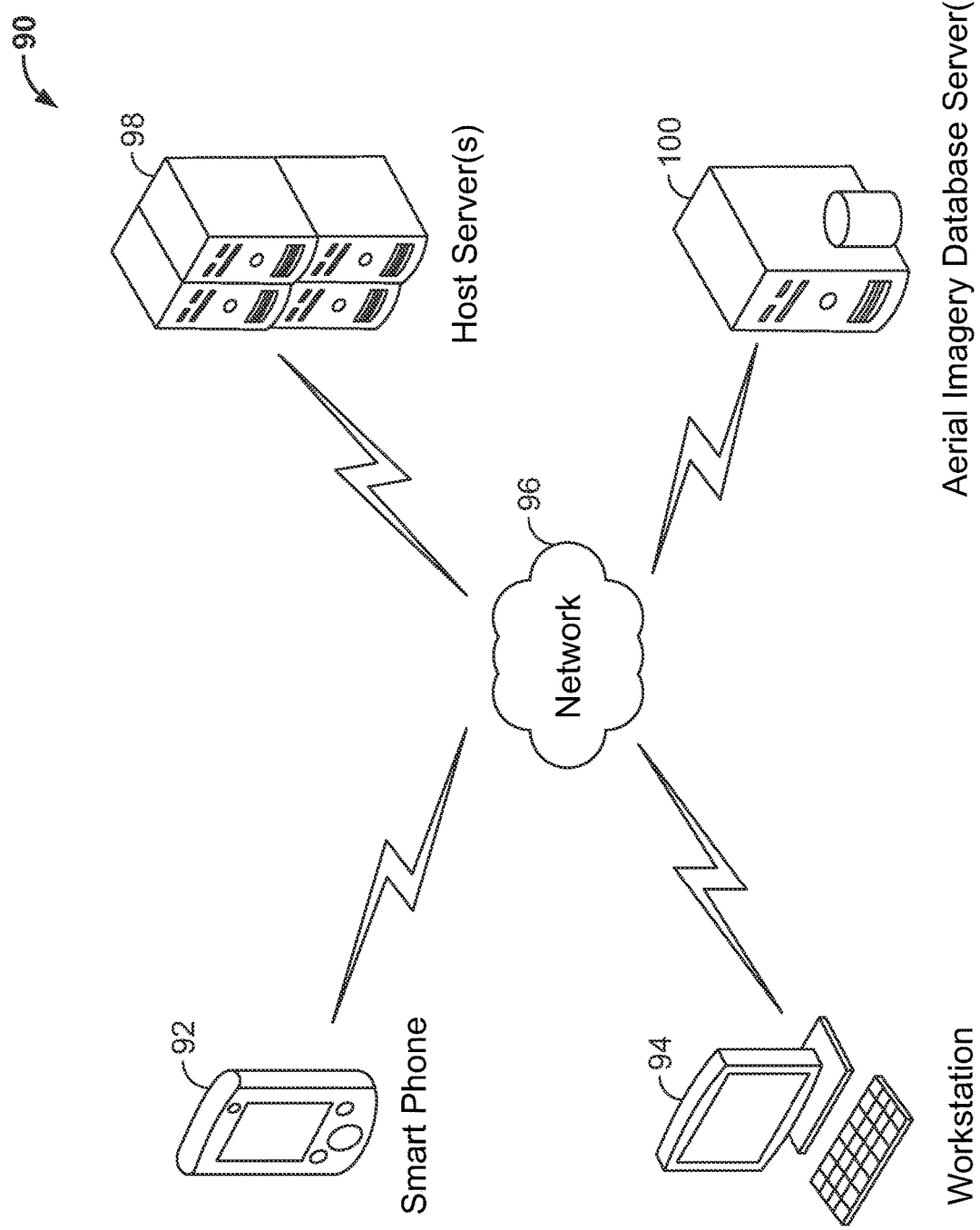
FIG. 9 is a diagram illustrating sample hardware components on which the system of the present disclosure could be implemented.

FIG. 9 is a diagram illustrating sample hardware components 90 on which the present invention could be implemented. The system could be implemented on a computer system using any suitable programming language such as C, C++, C#, Java, Python, or other suitable programming language, and could be embodied as computer-readable and executable code executed by a suitable computer system, such as one or more host servers 98. Such servers could be cloud-based servers that are accessible from one or more user devices such as smart phones 92 or workstations 94 which are in communication with the servers 98 via a network 96 (e.g., over the Internet). The servers 98 could also communicate with one or more aerial imagery database servers 100 in order to obtain and process aerial imagery to generate 3D models of structures and property depicted in such imagery, as disclosed herein. Still further, the system of the present disclosure could be implemented entirely on an end-user device if desired, in the form of a program installed on and executed by the phone 92 and/or workstation 94.

The systems and methods disclosed herein could be extended to allow users to rapidly develop annotated computer models of water damage relating to a structure, as well as tasks and costs associated with mitigating such damage. Such embodiments of the system will now be disclosed in connection with FIGS. 10-18.

Figure 10:
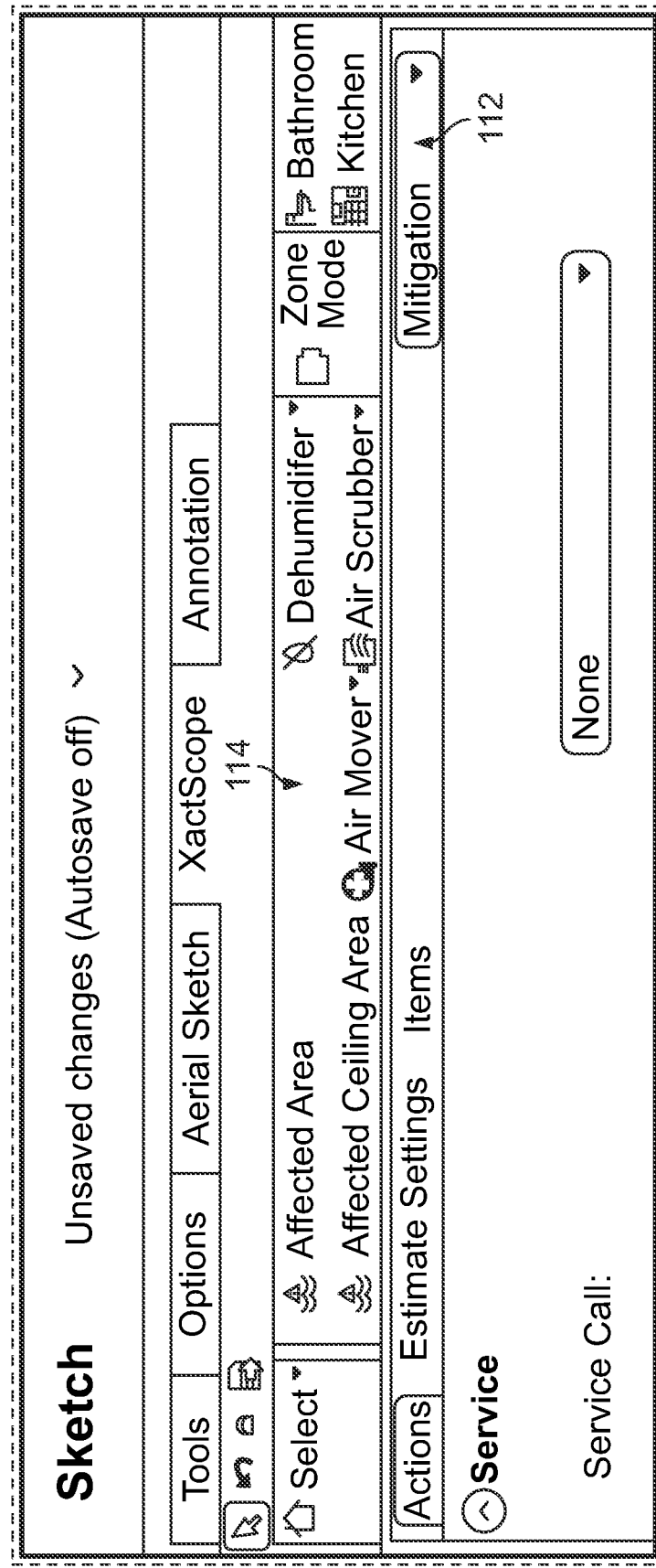
FIG. 10 is a diagram of another embodiment of the system of the present disclosure, wherein an annotated computer model of water damage and/or mitigation relating to a structure can be generated.

FIG. 10 is a diagram of another embodiment of the system of the present disclosure, wherein an annotated computer model of water damage and/or mitigation relating to a structure can be generated. The system generates a user interface 110 and associated tools that assist a user in accurately scoping the cost of work needed to mitigate water damage to a property. This includes the various materials, labor, and calculations for equipment such as air movers, air scrubbers, dehumidifiers, etc. As will be discussed in greater detail in connection with FIGS. 11-13, the system allows a user to generate a floorplan model of a structure including rooms, openings, and various other relevant objects such as toilets, cabinets, etc. This floorplan model can be drawn by the user using the interface 110 or imported from a file, if desired. As shown in FIG. 10, the interface 110 includes a "Mitigation" pull-down tool that the user can select to begin generating a model (e.g., floorplan) of a structure. Additionally, the user can select and utilize one or more drawing and annotation tools 114 which allow the user to further define the water damage and/or mitigation model, as discussed in greater detail below.

Figure 11:
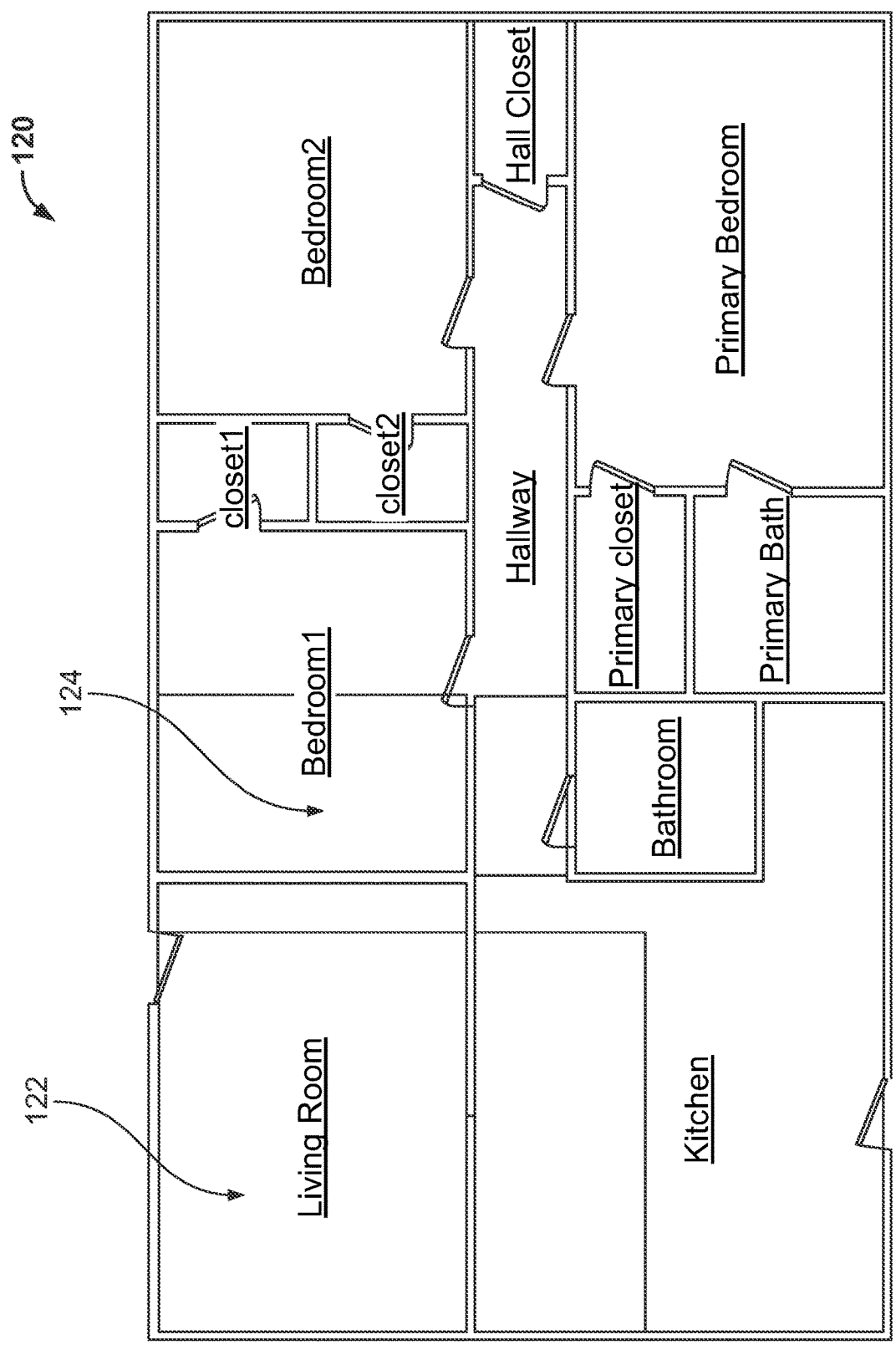
FIG. 11 is a diagram illustrating a water damage and/or mitigation model capable of being generated by the system of the present disclosure.

FIG. 11 is a diagram illustrating a water damage and/or mitigation floorplan model 120 capable of being generated by the system of the present disclosure. Utilizing the tools of the user interface 110, the user can either draw the floorplan model 120 (corresponding to the floorplan of a building or structure), or import the model from a file. Once the floorplan model 120 has been created, it can be annotated to indicate areas 122, 124 where water damage exists, and/or areas where mitigation of water damage should be addressed. The areas 122, 124 are used to define the area within a property that has been damaged by the water or other contaminants. The affected areas are used in calculations and as inputs to the questions presented to the user. There are three distinct types of areas that can be defined, but of course, others are possible:

1. Floor Affected Areas: these are represented in the area 124, and can be placed in rooms in three different ways:
   a. Click-and-drag to place a rectangular area. This can overlap multiple rooms, or just be in part of a single room, or anything in between.
   b. Double-click in a room to place the area to cover the entire floor of the room.
   c. Point-to-point: single-click once to place the starting point, then move the mouse to the next corner of the area. This method can be used to make any shape of affected area required.
2. Wall Affected Area: These can be represented in various colors and can be placed in rooms in three different ways:
   a. Flood Lines can be placed by right-clicking a selected room and choosing the distance up the wall where the user wishes the flood line to be placed. This will place a flood line at the measurement listed, down to the floor, on every wall of a room.
   b. Double-click on a wall surface to place an affected area that covers the entire wall surface.
   c. Point-to-point: Single-click to place the starting point, then move the mouse to the next corner of the area. This method can be used to make any shape affected area required.
3. Ceiling Affected Area: These can be represented in various colors, and ceilings can be shown or hidden. Ceiling affected areas can be designated using the same methods that can be used for Floor Affected Areas.

Figure 12:
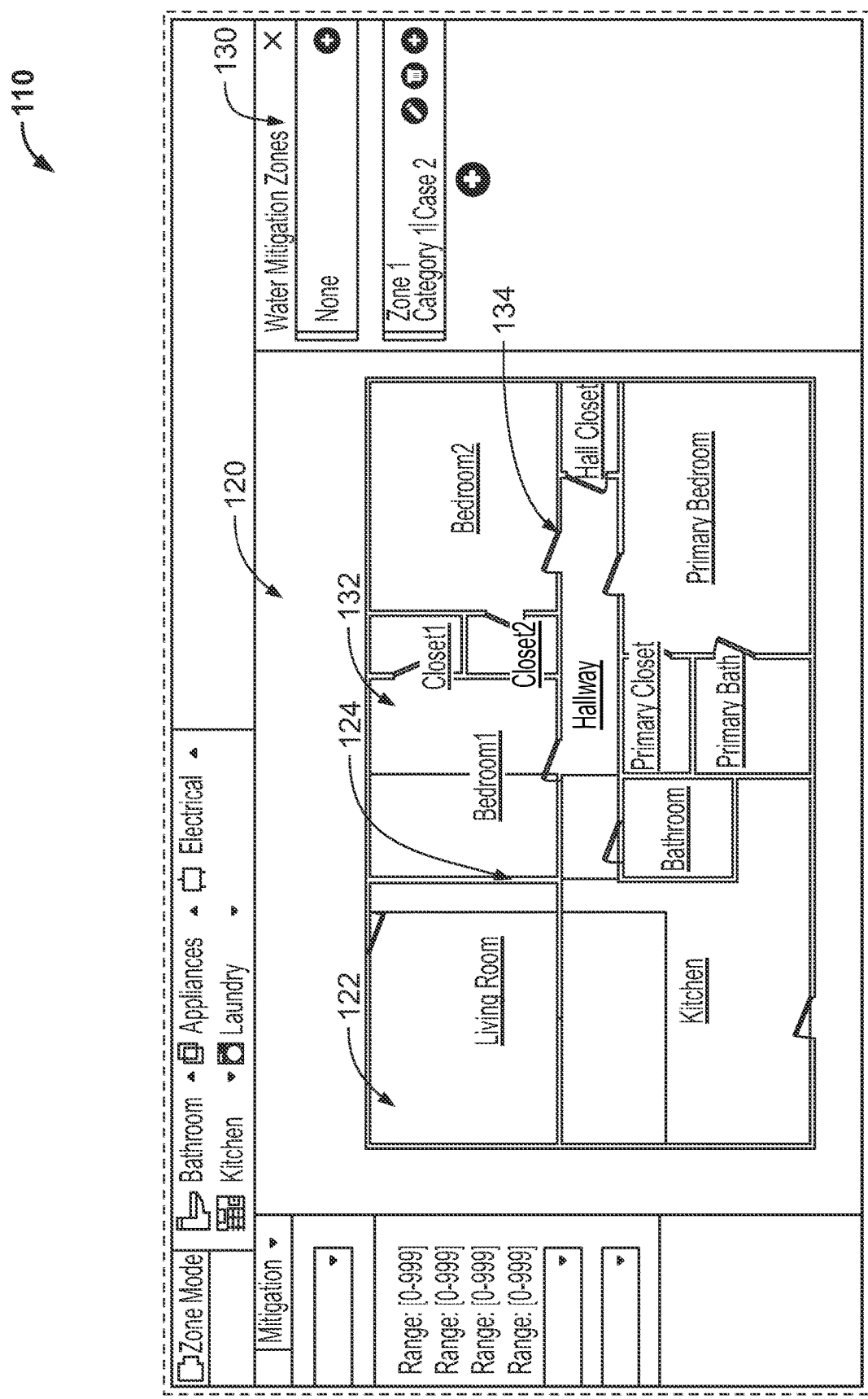
FIG. 12 is a diagram illustrating the user interface of the system of present disclosure, wherein water damage and/or mitigation zones are defined.

FIG. 12 is a diagram illustrating the user interface of the system of present disclosure, wherein water damage and/or mitigation zones are defined. As can be seen, the interface 110 includes the floorplan model 120, which includes various areas 122, 124, 132, and 134 indicating water damaged areas. Various water mitigation "zones" 130 can be defined and accessed by the user. Each zone is a set of rooms that received a specific type of water damage or need to be calculated differently than other rooms. Multiple rooms can be defined in a single zone. However, a room can only be part of a single zone. If two separate zones are needed in the same room, the room can be split, and the new wall marked as missing wall. The missing wall can be set to be a barrier if desired. The split rooms can also be combined so one is a subgroup of the other to keep them together as a group, but each of the split rooms can be placed in a different zone for water mitigation.

Figure 13:
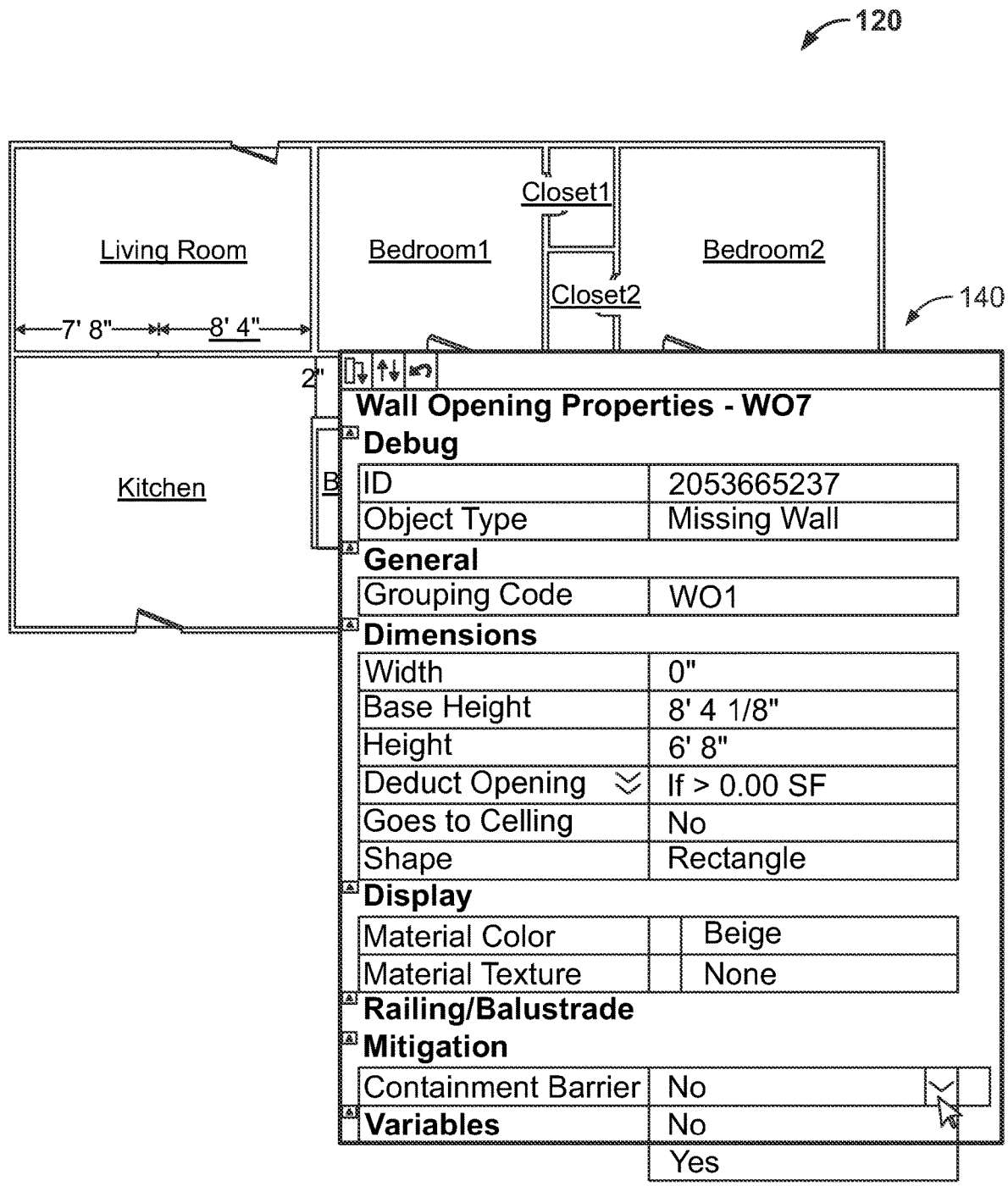
FIG. 13 is diagram illustrating a user interface tool for defining barriers between water damage and/or mitigation zones of the model.

FIG. 13 is diagram illustrating a user interface tool 140 for defining barriers between water damage and/or mitigation zones of the model 120. Barriers are placed between zones to contain the environment the equipment is working in. Barriers can be set on openings between rooms such as doors or missing walls. This is done by selecting the opening and setting the barrier property.

Figure 14:
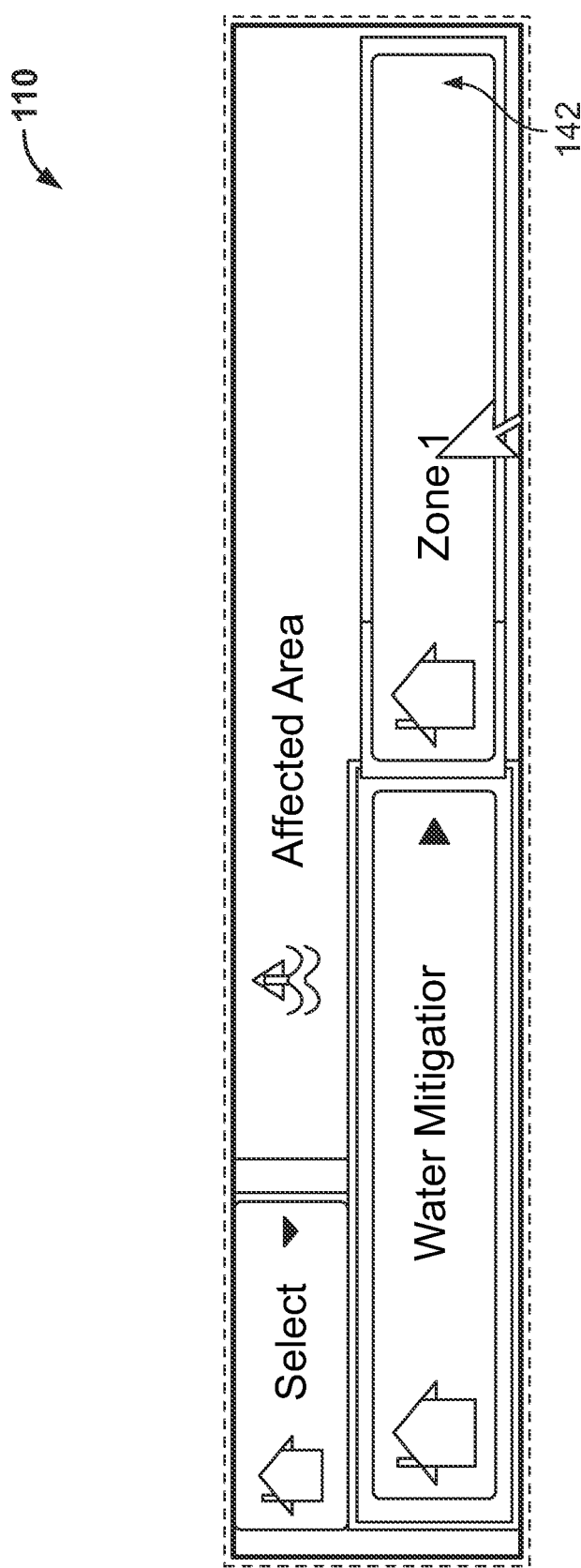
FIG. 14 is diagram illustrating a user interface tool for selecting one or more water damage and/or mitigation zones of the model.

FIG. 14 is diagram illustrating a user interface tool 142 for selecting one or more water damage and/or mitigation zones of the model. The tool 142 (of the interface 110) can be pulled down by the user to select a particular zone. Once the desired zone is elected, the system automatically generates a set of questions that are presented to the user based on the objects that exist in the selected zone. The user will primarily work with selections of rooms or a zone, and the user can either manually select the room(s) for which additional information is to be specified ("scoped"), or select all rooms belonging to a particular zone (for which additional information is to be specified).

Figure 15:
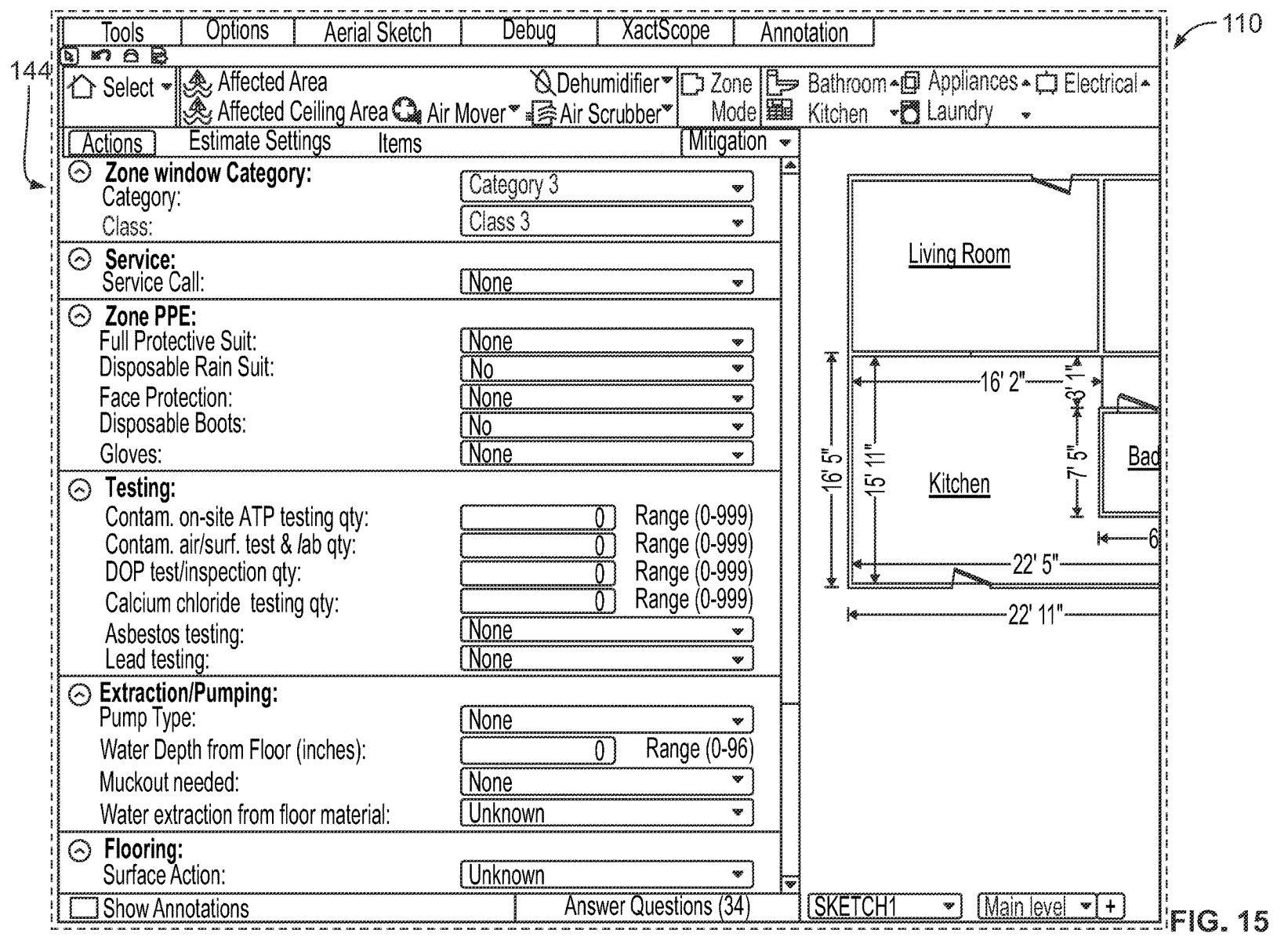

FIG. 15 is diagram illustrating a user interface tool 144 for guided capturing of information relevant to modeling of water damage and/or mitigation of a structure. The tool 144 is displayed by the interface 110, and presents a list of questions that serves as a guide or a "script" for the user to follow to ensure that the user includes include all necessary items required to generate an estimate for mitigating water damage. The script can be customized for individual customers, workflows, and industry standards. The user also can set default answers at various administrative levels to ensure end users follow a particular protocol.

The questions presented in the tool 144 can be listed in a particular order or hierarchy. The answers to higher level questions are used to determine which lower-level questions should be presented. The objects from the floorplan and other calculations also limit the questions to only those that are relevant. This automates and simplifies the workflow for the user and makes it significantly more efficient. A non-limiting example of or a typical set of the types of questions a user would be presented by the system for water mitigation is as follows:

Category and Class of Water (May also been set earlier in the zone creation). These determine some of the types of cleaning, equipment, and labor that will be needed in the subsequent questions.
Service Calls
Zone PPE (Personal Protective Equipment)
Testing
Extraction Pumping
Flooring
Walls
Baseboards
Containment/Coverings/Barriers
Ducting
Monitoring/Setup/Decontamination The user works down the list presented in the tool 144, answering each question presented in the tool 144. As this occurs, a set of line items is generated based on those answers.

Optionally, a user can allow the script to guide them to questions that require an answer to complete the items list. When the "Answer Questions" button at the bottom of the Script Pane is red, this means there are remaining unanswered questions. The numerical value in parentheses indicates the number of unanswered questions remaining. Clicking this button will automatically change the selection as necessary and take the user to the next unanswered question. Note that often, answering a single question will reduce the unanswered questions by more than one, because the answer given is applied to multiple objects. For example, answering the Floor Surface Action for 6 rooms will reduce the total unanswered questions by 6. Also note that occasionally, answering an unanswered question will cause other questions to appear, depending on the answer given. A user should expect the number of unanswered questions to fluctuate up and down as they work until all questions are answered.

With most water mitigation projects, various environmental and other data is collected from the property. This may be moisture saturation readings from various materials, water depth, interior/exterior humidity and temperature, etc. These readings are taken at the beginning of the mitigation, then taken at various intervals throughout the project to establish a baseline and then verify the mitigation is working and on track. The tools described herein can allow users to graphically place an object in the model (e.g., floorplan 120) to represent the location, type, date, time, and values for those readings. These readings can be used as inputs to the various calculations for what equipment or other actions are needed. Various reports can also be made available, based the on the collected data readings, equipment, and other actions taken as part of the mitigation project.

Figure 16:

FIGS. 16-17 are diagrams illustrating user interface tools or "cards" 150, 152 for performing calculations for equipment relating to water damage and/or mitigation of a structure. The affected areas, surface area, the shape of the room(s), the existing offsets within those room(s), and other factors are used as inputs to the calculations. A suggested quantity is provided in the various equipment sections of the questions. These calculations follow industry standards such as the IIRC S500 rules. For example, suggested number of Air Movers is provided in the Zone Air Moving Equipment card shown in tools 150, 152 of FIGS. 16-17. These calculated suggestions can be used to guide the user to add the necessary equipment. Tools are provided for the user to graphically place specific equipment objects in the floorplan model, showing any relevant orientations, in the configuration they deem best. As these objects are placed, the questions are updated to reflect the amount of equipment placed, allowing the user to compare it to the suggested amounts. Equipment can be given an individual number of days that item will operating in the room. The total days of equipment is shown in the card 152 of FIG. 17. Additionally, the cards 150, 152 could automatically place the equipment in the floorplan model, using inputs and rules to determine optimal locations based on the specific geometry of the rooms and other objects in the floorplan model.

FIG. 18 is a diagram illustrating a report 154 generated by the system listing tasks and associated costs for mitigating water damage of a structure as modeled by the system. As each question is answered, the list 154 is generated. Once complete, the list 154 can be exported into the estimate by clicking the Add Items button. If any answers are changed a new list will be generated, and those items will be replaced with the new set only if the Add Items button is clicked again. Selecting an item will highlight where in the floorplan model the item applies. This provides an easy way for users or other reviewers to validate that the items are placed correctly.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method for rapidly developing an annotated computer model of water damage relating to a structure, comprising the steps of:
    generating a computerized floorplan model of a structure in a user interface of a computer system;
    graphically defining at least one area within the floorplan model corresponding to a region where water has damaged the structure;
    graphically depicting the at least one area in the floorplan model in the user interface;

automatically generating and displaying in the user interface a plurality of questions to be answered by a user of the system relating to the at least one area within the floorplan model;

allowing the user to answer the plurality of questions relating to the at least one area within the floorplan model; and generating a list of actions to be taken to mitigate water damage in the at least one area of the structure.

2. The method of claim 1, further comprising allowing the user to define a plurality of areas within the floorplan model corresponding to regions where water has damaged the structure.

3. The method of claim 2, further comprising allowing the user to generate a zone encompassing the plurality of areas.

4. The method of claim 2, further comprising allowing the user to define one or more boundaries between the plurality of areas using a boundary tool.

5. The method of claim 1, wherein plurality of questions are presented to the user in a guided script.

6. The method of claim 1, further comprising displaying a user interface tool to the user allowing the user to perform a calculation relating to a piece of equipment that can be utilized to mitigate water damage.

7. A system for rapidly developing an annotated computer model of water damage relating to a structure, comprising:

a computer system having a memory and a display; and a processor of the computer system, the processor programmed to perform steps of:

generating a computerized floorplan model of a structure in a user interface of a computer system;

graphically defining at least one area within the floorplan model corresponding to a region where water has damaged the structure;

graphically depicting the at least one area in the floorplan model in the user interface;

automatically generating and displaying in the user interface a plurality of questions to be answered by a user of the system relating to the at least one area within the floorplan model;

allowing the user to answer the plurality of questions relating to the at least one area within the floorplan model; and generating a list of actions to be taken to mitigate water damage in the at least one area of the structure.

8. The system of claim 7, the processor allowing the user to define a plurality of areas within the floorplan model corresponding to regions where water has damaged the structure.

9. The system of claim 8, the processor allowing the user to generate a zone encompassing the plurality of areas.

10. The system of claim 8, the processor allowing the user to define one or more boundaries between the plurality of areas using a boundary tool.

11. The system of claim 7, wherein plurality of questions are presented to the user in a guided script.

12. The system of claim 7, the processor displaying a user interface tool to the user allowing the user to perform a calculation relating to a piece of equipment that can be utilized to mitigate water damage.

* * * * *

UNITED STATES PATENT AND TRADEMARK OFFICE
CERTIFICATE OF CORRECTION

| | | |
|---|---|---|
| PATENT NO. | : 12,314,635 B2 | Page 1 of 1 |
| APPLICATION NO. | : 17/122080 | |
| DATED | : May 27, 2025 | |
| INVENTOR(S) | : Dave Harris et al. | |

It is certified that error appears in the above-identified patent and that said Letters Patent is hereby corrected as shown below:

On the Title Page

On page 2, under item (56) the References Cited U.S. Patent Documents, Column 1:
6,448,964, "Saacs et al" should be deleted and replaced with "Isaacs et al."

Signed and Sealed this
Twenty-fifth Day of November, 2025

John A. Squires
*Director of the United States Patent and Trademark Office*